Aug. 26, 1958  B. BURWELL  2,849,121
PRESSURE FILTER
Filed Sept. 22, 1954  9 Sheets-Sheet 1
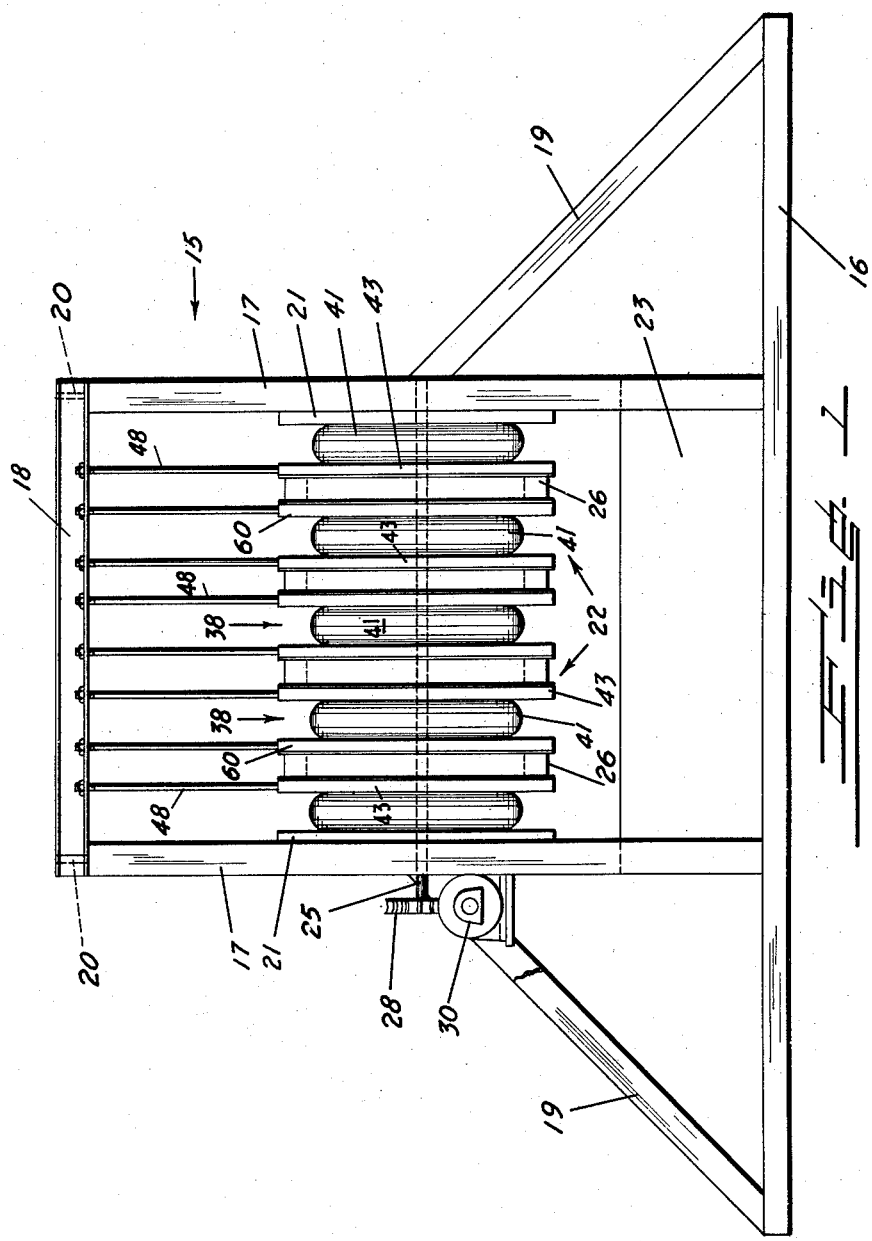
INVENTOR.
Blair Burwell
BY
ATTORNEY Aug. 26, 1958  B. BURWELL  2,849,121
PRESSURE FILTER
Filed Sept. 22, 1954  9 Sheets-Sheet 2
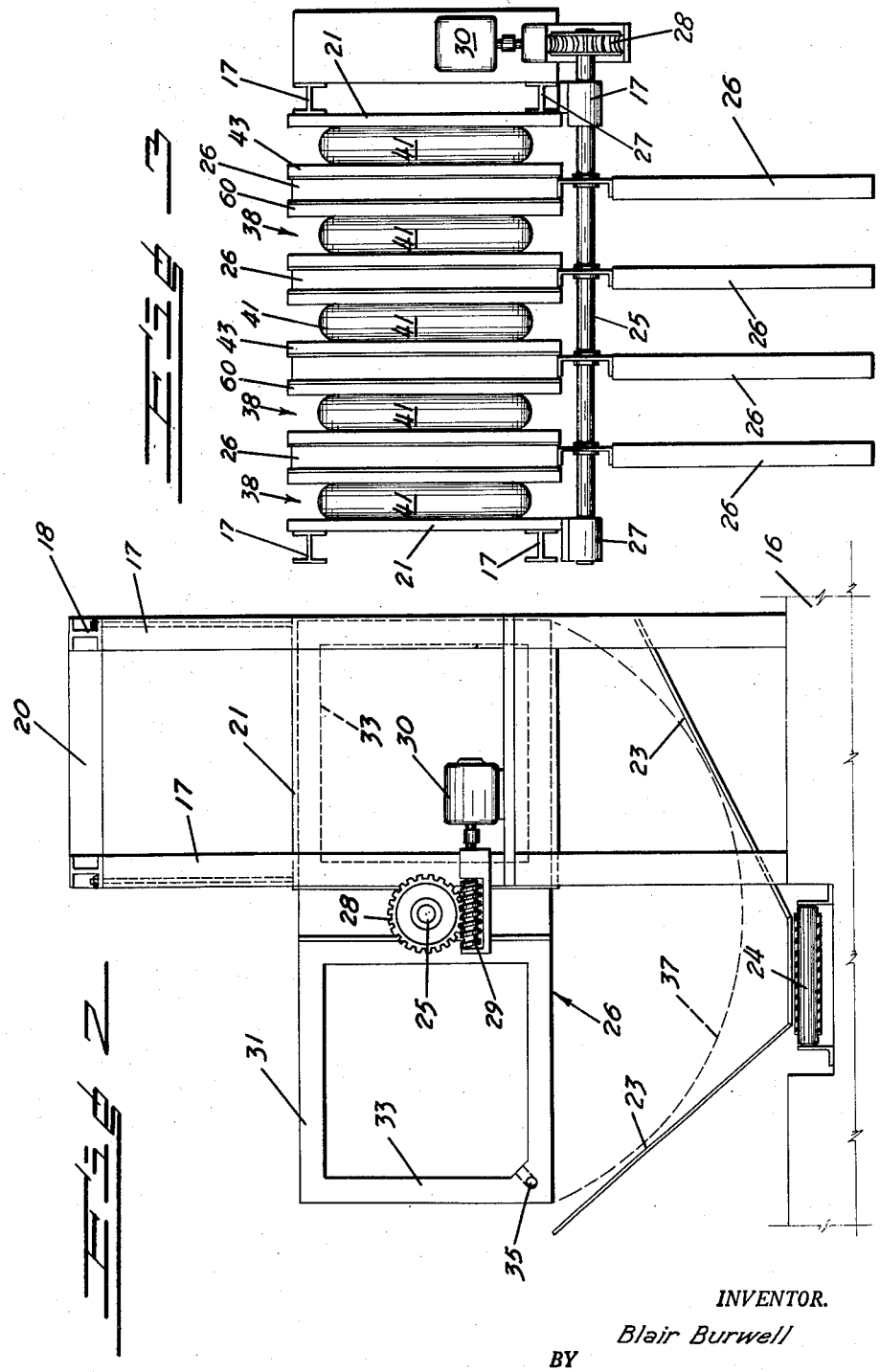
INVENTOR.
Blair Burwell
BY
ATTORNEY

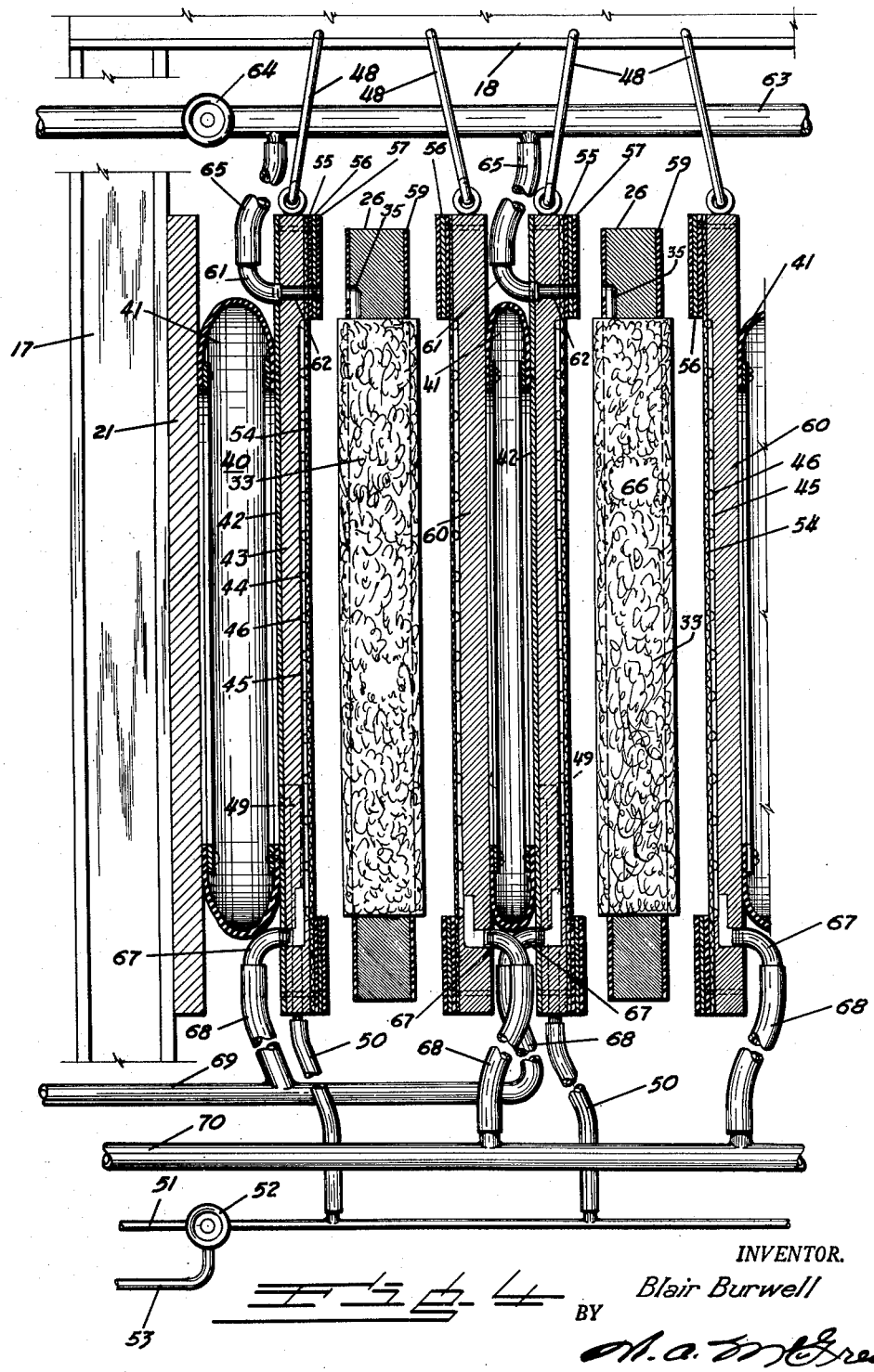

INVENTOR.
Blair Burwell
ATTORNEY

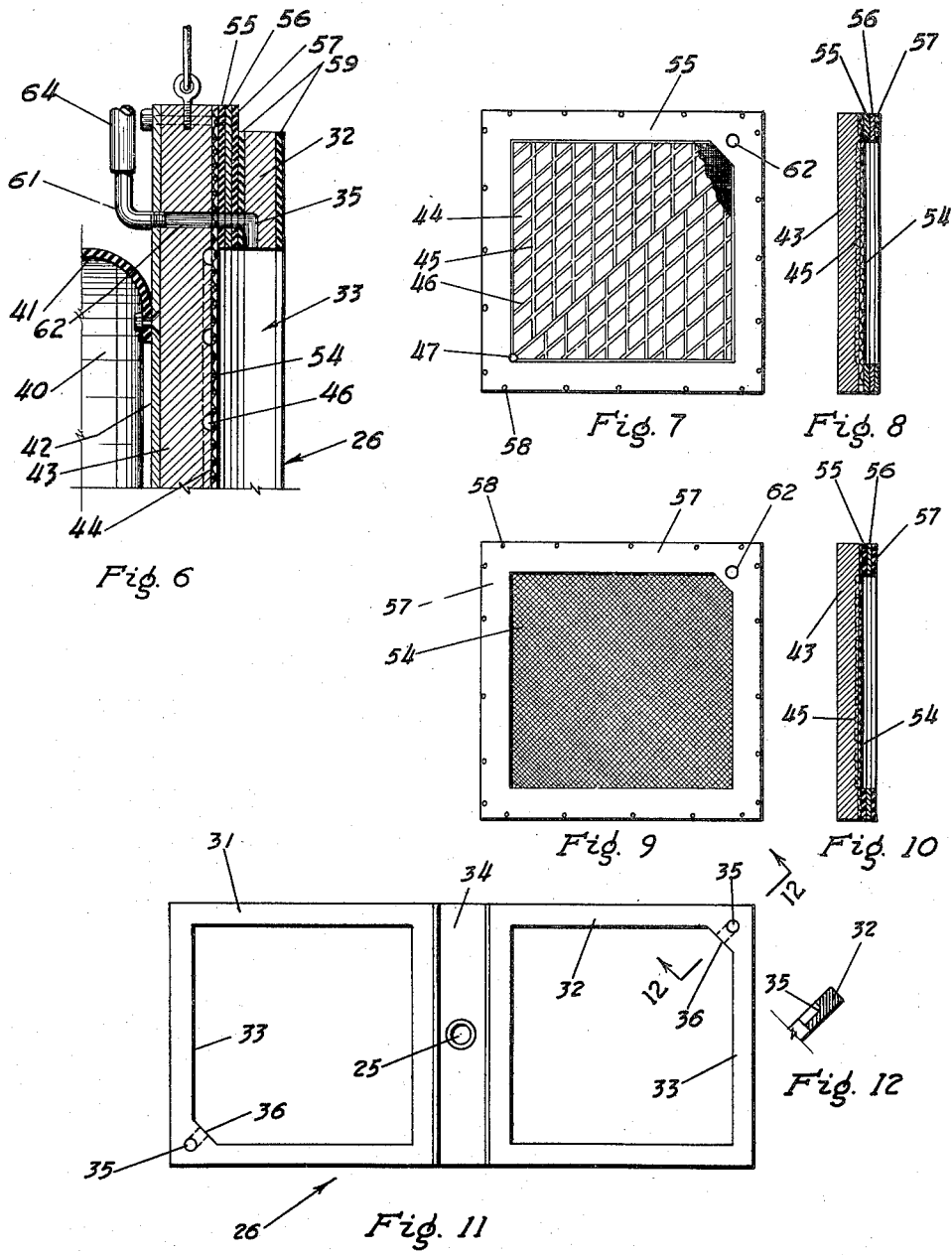

Aug. 26, 1958     B. BURWELL     2,849,121
PRESSURE FILTER

Filed Sept. 22, 1954     9 Sheets-Sheet 6

INVENTOR.
BLAIR BURWELL
BY

ATTORNEYS

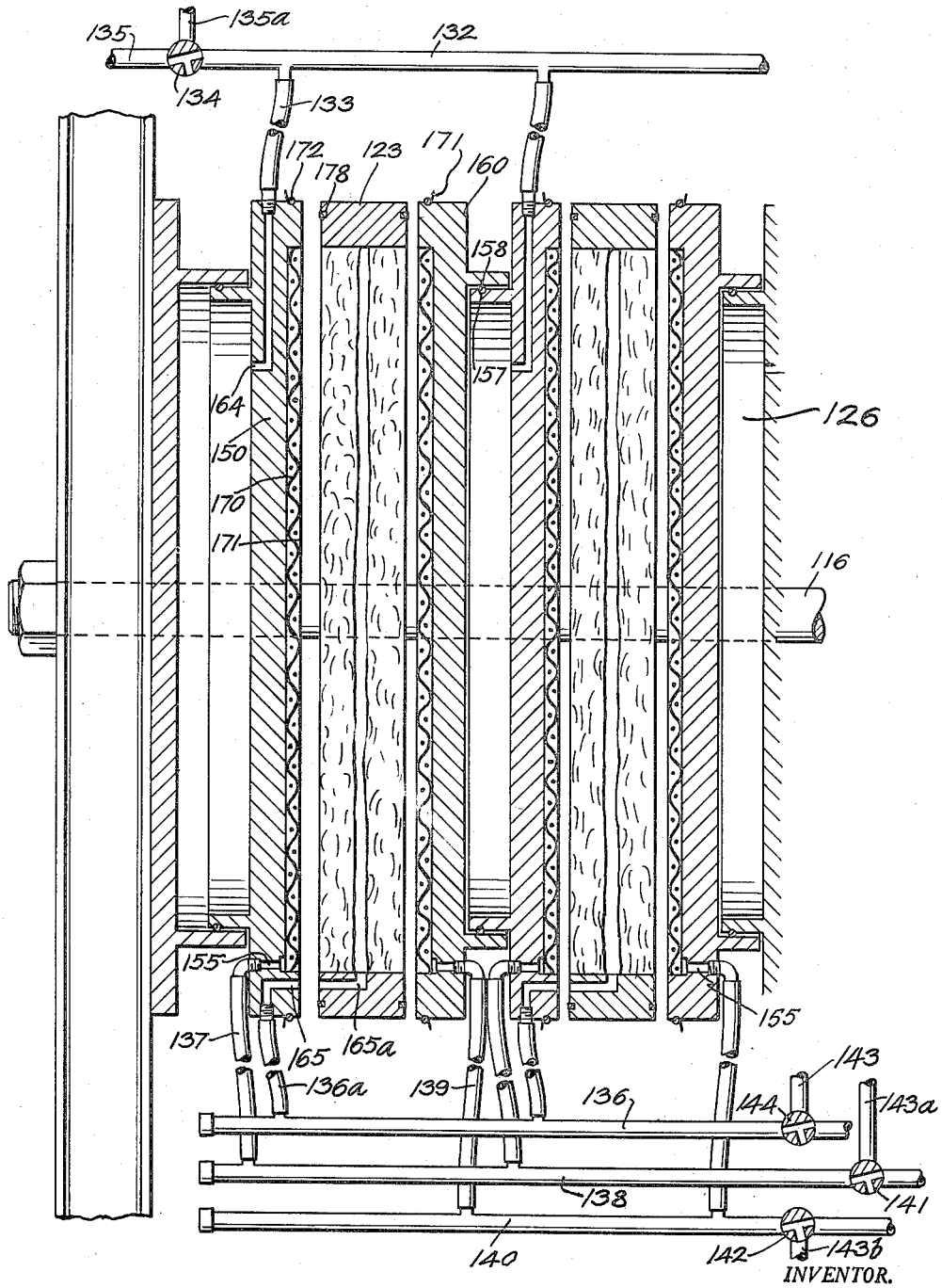

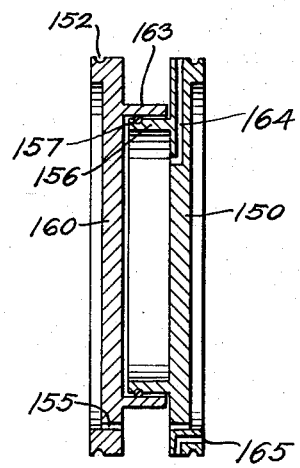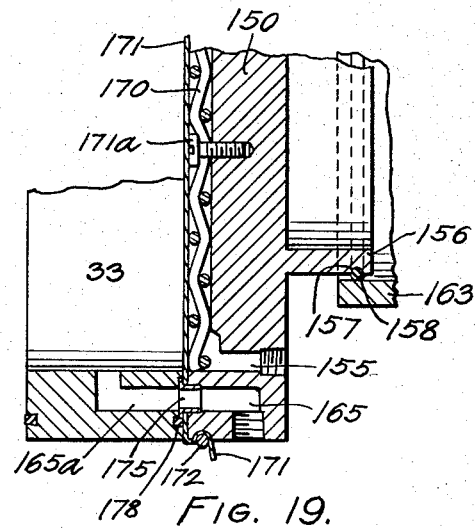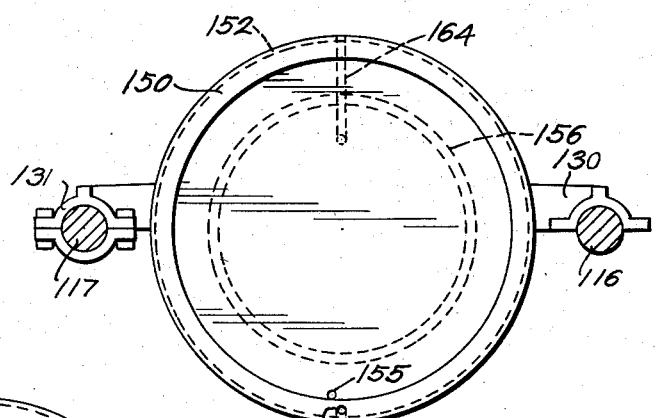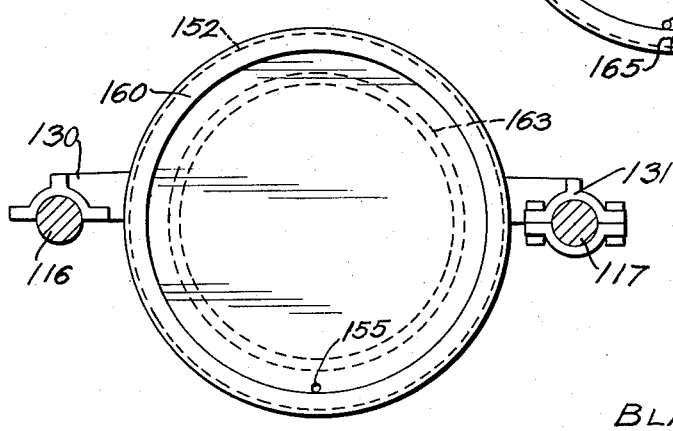
INVENTOR.
BLAIR BURWELL
BY
ATTORNEYS

United States Patent Office 2,849,121
Patented Aug. 26, 1958

2,849,121

PRESSURE FILTER

Blair Burwell, Grand Junction, Colo.

Application September 22, 1954, Serial No. 457,628

13 Claims. (Cl. 210—226)

This application is a continuation in part of S. N. 299,450, filed July 17, 1952, now abandoned.

In processes of treating of ores, minerals and other substances to extract from them valuable constituents, mixture of acids or other chemicals in solution are used to make soluble the valuable elements. It is often found necessary that the resulting slurry or mixture of liquids and solids is of such a nature that an efficient separation of liquids and solids cannot be made by settling, or by employing filtering devices using vacuum, such as vacuum filters. In many of these mixtures the solid particles are of such a slimy or colloidal nature as to prevent their separation unless pressures are used in excess of 14 pounds per square inch in the filtering step. In filtering these slurries it is often necessary to use filtering presses, which employ pressures from 14 to 100 pounds or more per square inch to force the liquid through the solids and filter medium in order to separate solids from the liquid.

However, the manner in which these devices are constructed and operated requires much labor to attend the device, such as cleaning the machine of its solid cake, and cleaning the filter cloth after each usage. Usually two men are employed, approximately two hours in removing the solid cake and in cleaning and replacing filter cloths between each cycle of filtration.

As a result the cost of using filter presses is often so high and their capacity is so low as to preclude their use in filtering large tonnages of solids. Apparatus is therefore needed which will enable the use of high pressures in filtration without excessive manual labor to discharge or remove the filtered solids. Further, an apparatus is needed which will enable the filter cloths to be cleaned of adhering solids without hard manual labor and excessive costs. Accordingly, among the objects of this invention is to devise a new pressure filtering apparatus which will enable the use of pressure in excess of fourteen pounds per square inch to separate liquids from solids by means of a filter cloth or medium, which permits removal of the separated solids from the apparatus quickly and efficiently, which will enable the washing of filtered solids free of valuable liquid, and which will permit the blowing and cleaning of filter cloth while it is in place and without manual labor.

This object has been obtained by designing a machine including a number of assemblage of pressure chambers and filter frames in which the latter are alternately placed between the pressure chambers. The filter frames are preferably mounted on a horizontal axis at uniform spaced fixed distances apart whereby they may be moved as a unit into and out of filtering positions between the assemblage of pressure chambers. Each pressure chamber preferably includes two stout plates of steel or cast iron to form a pair of relatively movable sides for the chamber adapted to be moved outwardly in a horizontal direction by pressure means located between these sides. When the pressure means is relieved, the two sides move toward one another to release the filter frames from between adjacent pairs of pressure chambers and to admit other filter frames. These side plates are supported from above or the sides in a position so that while the sides of the pressure chambers can move in a horizontal direction away from or towards each other, the pressure chambers themselves maintain their relative fixed spacing along the horizontal axis of the machine.

The metal plates forming the two sides of each pressure chamber, are equipped to act as filter plates on the face thereof farthest away from the pressure chamber by the provision or attachment on this face of a grooved or ridged surface for drainage of the filtrate. This drainage area is covered with a filter cloth or media attached to each plate. The manner of attachment may vary, but a preferred method is to mount a rubber-covered filter cloth retaining plate or frame around and over the border of the filter cloth and attach this plate to the side plate by bolts or screws. In this manner the filter cloth is so attached and sealed to the side plate around its marginal portion that air can be introduced behind the filter cloth for blowing or cleaning purposes.

In the spaces between pressure chambers and their attached pairs of filter plates and cloths are movable filter frames, which are mounted to be revolved in vertical planes at right angles to the horizontal axis of the pressure chamber assembly, but which are positioned and spaced horizontally to occupy the spaces between the filter plate sides of the pressure chamber.

The filter frames are attached together end to end in pairs so that two filter frames are joined in the same vertical plane. Further these frames are fastened in a symmetrical manner to a horizontal rotatable shaft, at right angles to the planes of the frames, at the same spacing between filter frame pairs along the shaft as the spacing of the pressure chambers. Thus, it is possible to assemble the movable filter frame pairs and their rotatable shaft so that the filter frames can rotate in and out of the spaces between filter plates of the pressure chambers.

When filter frames have been moved in vertical planes and stopped at predetermined positions between such filter plates, hydraulic or air pressure can then be admitted to the inflatable pressure chambers to force their filter plates outwardly in a horizontal plane to form liquid-tight joints with the marginal edges of the filter frames to thereby form them into filtration chambers. Means are provided for admitting at this time a mixture of liquids and solids into these filtration chambers under pressure. The arrangement of the filter is such that the mixture of liquids and solids can be admitted to the bottom of the filtering chamber or, if desired, to the top of the filtering chamber.

This enables the operator to adjust the manner of filling to suit the character of the mixture to be filtered. For instance, in the case of slurries containing a mixture of coarse and fine solids it is advantageous to introduce the material into the bottom where rising currents prevent a segregation or separation of coarse solids and fine solids, thus permitting uniform filtration and washing. In the case where fine slurries are separated the filter chamber may be filled from the top. Means are also provided for conducting the separated liquids which pass through the filter cloths and underlying liquid channels of each filter plate to suitable filtrate outlet ducts. Due to the pressure created in the pressure chambers and exerted through the filter plates to the joints between the margins of the filter frames and bordering surfaces of these plates, the liquids within the filter frames are forced to escape through the filter cloths into the filtrate ducts, leaving the cake behind in the filter frames. After the formation of the solids in the filter frames, wash water or solution may be admitted through one filtrate outlet of each chamber which forces the wash water to pass up through the drainage channels, through the filter cloth and filter cake, and finally through the filter cloth on the opposite side of the chamber, to its connecting drainage channels and thereby out of the filtering chambers. Wash water or solution, under suitable pressure may also be admitted through the same connections or means which are used for admitting the mixture to be filtered, such as at the bottom of the filter chamber, in which case the wash water or solution passes through the cake in the same manner as the separated solution of the mixture.

Upon completion of a desired filtration and washing cycle, the pressurizing liquid or air is evacuated from all pressure chambers in unison whereby, from vacuum or by other means, the filter plates of the pressure chambers are withdrawn from their sealing positions with the filter frames. At this time air may be admitted into the filtrate outlet ducts and channels to blow the solids from the filter cloths.

The assembly or series of filter frames may be thereupon revolved, for instance 180 degrees, which moves the cake filled frames clear of the pressure chambers for removal of cake at the same time that empty and cleaned filter frames enter the spaces vacated by the filled frames. The filtered solids are then discharged while the filtration cycle proceeds on a new cycle repeating the above operations as rapidly as washing, cleaning and re-positioning can be performed.

In general, this is the operation of the apparatus and it will be apparent that another object of the invention is to provide apparatus of the above character in which means are provided for supporting the pressure chambers in relatively fixed positions while their sides can be expanded and contracted into operative relation with the filter frames or chambers lengthwise of the apparatus, said apparatus including means for rigidly mounting the assemblage in a framework to confine the thrust of the pressure chambers in a horizontal plane and at the same time maintain the relative position and spacing of the alternately arranged filter and pressure chambers.

A still further object of the invention is to provide this apparatus with filter frames, which can be either circular or rectangular, with its two opposite sides open for easy cleaning, such sides being closed and sealed to form a filtration chamber by clamping the sides of adjacent expansible chambers against the sides of the filter frames when they are in cooperative positions to register their slurry ports with those of the expansible chambers having relatively fixed centers, and to form a structure in which the filtered liquid must pass through the filter cloths or screens in order to find outlet from the filtration chamber and into the outlet pipes for the filtrate.

Another object of the invention is to provide arrangements whereby wash fluids can be forced back through the separated cake for cleaning the same into the drainage channels behind the cloth or screen. Later after the filter frames are withdrawn, air under pressure may be directed through the same channels to free the filter cloths of all accumulations.

Other objects and advantages will become apparent during the course of the following description.

In the accompanying drawings forming a part of the description and wherein like numerals are employed to designate like parts through several views, Figures 1 to 13 illustrate one manner of applying the features of the invention, using square filter frames and admitting the mixture of solids and liquids to be filtered at the top of the filter chambers, and Figures 13 to 21 inclusive illustrate a modified device using round filter frames and means of admitting the mixture at the bottom of the filter chamber. Alternate manner of attaching the filter cloth is also shown and alternate manner of sealing the pressurizing chamber. In this manner illustrated the device can be adjusted to varying conditions of the mixture to be separated. The figures are further described.

Fig. 1 is a side elevation of the apparatus;

Fig. 2 is an end elevation of the same;

Fig. 3 is a top plan of the assembly of filter frames viewed from above and shown in its cooperative position with the series of expansible pressure chambers;

Fig. 4 is an enlarged vertical section of one end of the series of filter frames and pressure chambers in position after the filtering and washing cycle is completed and the filter frames with their accumulated solids or cake are free to be revolved out from between the pressure chambers to a dumping position;

Fig. 6 is an enlarged vertical longitudinal section of the upper ends of a filter frame and one side of a pressure chamber shown clamped against the same in the cooperative position shown in Fig. 5 showing the slurry ducts aligned for filling of the filter frames;

Fig. 7 is a plan of one side of a pressure chamber with the filter cloth or screen broken away to show the underlying drainage channels;

Fig. 8 is a vertical section of the same;

Fig. 9 is a plan view of the side of a pressure chamber showing the filter cloth or screen in position covering the drainage channels;

Fig. 10 is a vertical section of the same;

Fig. 11 is a plan of one of the double ended filter frames;

Fig. 12 is a section of the same taken on the line 12—12 of Fig. 11;

Fig. 15 is a top plan of the modified apparatus of Fig. 13, showing an assembly of filter frames in cooperative position with a series of expandable pressure chambers;

Fig. 17 is a cross section of the assembly shown in Fig. 16 after the filtering and washing cycle and the assembly is opened so that the filter frames with their accumulated solids or cake are free to be revolved out from between the pressure chambers;

Fig. 18 is a vertical section of a pressure chamber of the modified apparatus;

Fig. 19 is an enlarged section of details of the filling means for the chamber and the sealing means employed to make a liquid-tight filtering chamber;

Fig. 20 is an elevation of the male plate portion of the pressure chamber of Fig. 18;

Fig. 21 is a similar view of the filter face of the female plate portion of the pressure chamber.

Figure 5:
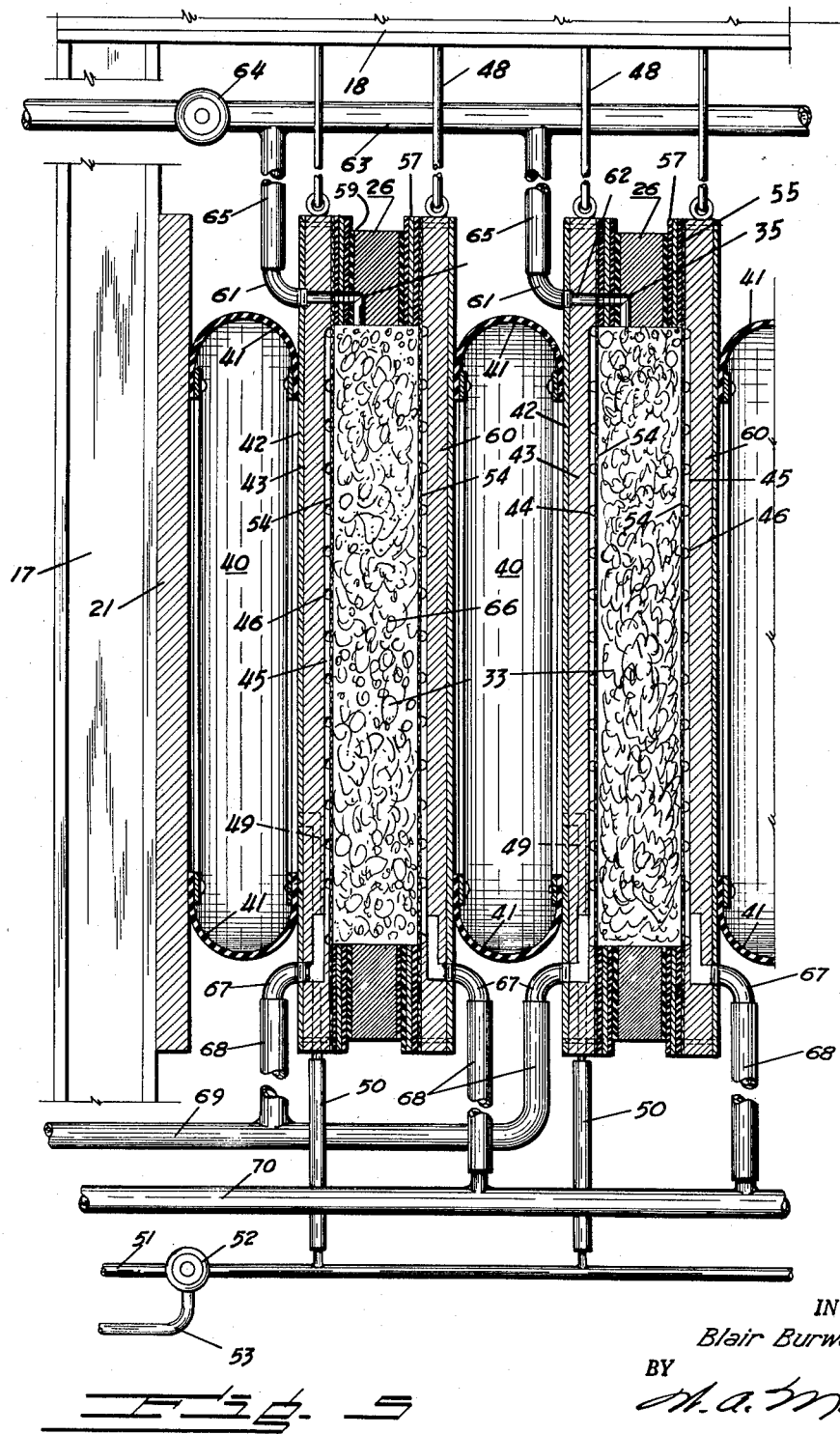
Fig. 5 is a similar view showing the series of filter frames and pressure chambers in position during its filling and filtering cycle with the pressure chambers expanded and forced against the filter frames and the thrust of the pressure chambers contained by the end thrust plates of the assembly.
Figure 13:
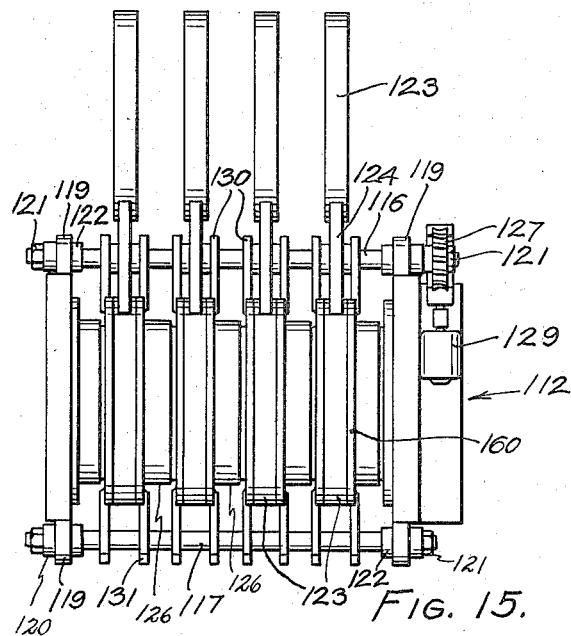
Fig. 13 is a side elevation of a modified apparatus according to the invention.
Figure 14:
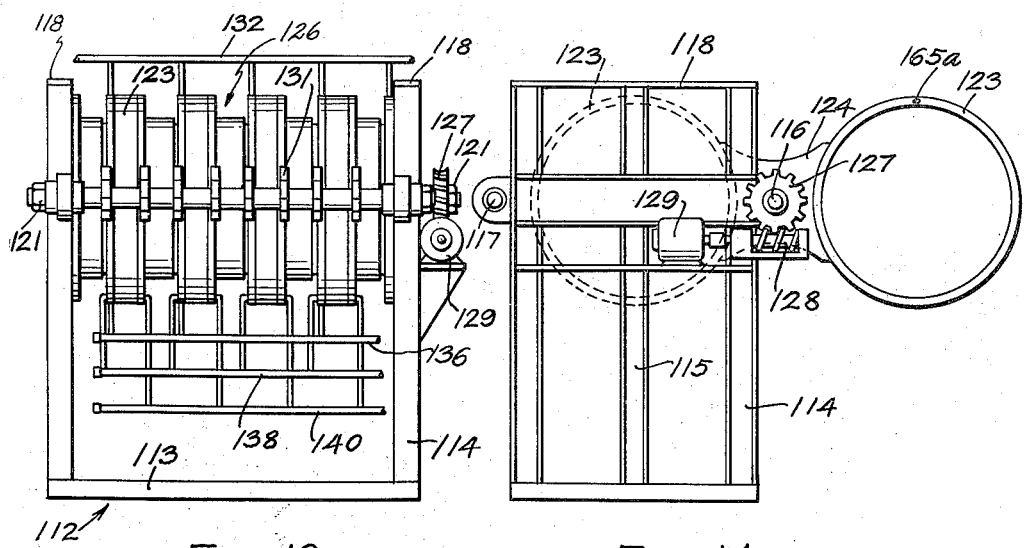
Fig. 14 is an end elevation of the device of Fig. 13.

Referring now more particularly to the drawings, wherein for the purpose of illustration and not for limitation, is shown one form of my invention; the numeral 15 designates a rigid thrust absorbing framework composed of a base 16 from which rise four corner post I-beams 17 connected in pairs at their tops by a pair of horizontal I-beams 18. The corner posts 17 are braced by diagonal thrust bearing struts 19 arranged diagonally between the posts and base as shown. The pairs of corner posts at opposite sides of the framework are also interconnected by cross braces 20 and by thrust plates 21 at opposite ends of the filtering assembly 22 to be presently described. Beneath this assembly 22 is a hopper having walls 23 converging downwardly to a power driven endless conveyor 24 for leading solids and cake discharged from the filtering assembly to a suitable place of discharge.

A horizontal shaft 25 forms the revolving support of a series of filter frames 26 and is mounted in bearings 27 on the two inside corner posts 17 and thrust plates 21 best seen in Figs. 2 and 3. One end of this shaft is provided with a pinion 28 driven by a locking worm 29 on the armature shaft of an electric motor 30 controlled manually or automatically to revolve the series of filter frames through an arc of 180 degrees each time the motor is energized and to come to a locked stop at this point when the motor is stopped. The purpose of this is to cause the double ended filter frames to have corresponding ends thereof disposed between the pressure chambers for filtration while the opposite ends thereof are simultaneously disposed 180 degrees beyond the chambers and clear thereof for cake removal and cleaning. As best shown in Fig. 11, each filter frame 26 of the series is composed of two identical square frames 31 and 32 each consisting of four posts or margins bounding an open space 33 and rigidly joined along adjacent sides by a channel bar 34 through the center of which extends the horizontal shaft 25. Thus, each filter frame presents, with its two open spaces 33, two separate filtering chambers alternately disposable between a pair of adjacent pressure chambers for the filtering operation. Each frame is provided with a gusseted corner which has an L-shaped passage or ducts 35 entering one side face of the corner and communicating at 36 with its respective opening or chamber 33. This passage is adapted to receive slurry from an adjoining pressure chamber plate, as will be presently described. The several filter frames are secured to the shaft 25 at equally spaced intervals as best seen in Fig. 3 and when this shaft is revolved, the pairs of filter frames move in vertical planes on a horizontal axis as shown by the dotted lines 37 in Fig. 2 above the hopper walls 23. The two frames 31 and 32 of each filter frame are coplanar in a vertical plane and their normal operative position is horizontal with one set of frames 31 disposed beyond the assemblage of pressure chambers 38 and the other set of frames 32 disposed between cooperative pairs of pressure chambers.

The assemblage of pressure chambers 38 includes the end thrust plates 21 and is a relatively fixed assemblage with relatively movable parts equally spaced apart for the reception therebetween of the filter frames 26. The pressure chambers at the extreme ends of the assemblage, each include an expansible chamber 40 formed by an outwardly bowed elastic strip or diaphragm 41, one longitudinal edge of which is secured in air and liquid tight relation to the thrust plate 21 while its opposite edge is similarly secured to a plate 42 removably attached to one side face of a movable stout steel or cast iron plate 43, the other side face 44 of which actually also serves as a filter plate. This face 44, as best seen in Figs. 6 and 7 is provided with equally spaced vertical drainage grooves or channels 45 intersected by equally spaced diagonal drainage grooves 46 which latter slant downwardly toward a filtrate outlet port 47 adjacent the bottom edge of the plate 43. These plates 43 are each supported by a pair of supporting rods 48 loosely connected thereto and to the cross beam 18 of the framework, in order to permit them to move in a horizontal direction towards or away from each other, or toward and from opposite sides of the filter frames 26 induced by pressurizing or evacuating the pressure chambers 40 with air or hydraulic pressure through a duct 49 provided in the pressure plate 43 and diaphragm retaining plate 42. A flexible pipe 50 is connected with this duct 49 and to a feed line 51 having a valve 52 therein for connection with a vacuum line 53 whereby the chambers 40 can be expanded, with this valve 52 in one position, or can be contracted, by operating this valve to cut off the pressure from pipe 51 and cause the vacuum line 53 to be communicated with the chambers 40 to retract the plates 43 away from the filter frames 26. By operating the valve 52, the vacuum can be cut off from the chambers 40 while pressure is admitted thereto to expand the chambers and cause the plates 43 to seal against opposite sides of the filter frames.

The pressure or filter plates 43 of the several expansible chambers 40 located between the end thrust plates 21 are arranged in pairs; the plates of each pair facing in opposite directions so as to present their sides having the drainage channels 45 and 46 next to the opposite side faces of each filter frame 26 to thereby form the openings 33 of the filter frames into filtration chambers into which the slurry is fed. Spread over the area of the drainage channels 45 and 46 is a filter cloth or rubber-coated screen 54 attached to the filter plate 43 by means of a border rubber mat 55 placed over the margins of the cloth and a metal retainer plate 56 covered by a second rubber mat 57, all of which are fastened in place to the filter plate 43 by means of bolts 58 disposed around the margins as shown in Figs. 7 and 9. Opposite side faces of each filter frame 32 are covered with a layer of rubber 59 to seal against the rubber mats 57 of the plates 43 when the latter are moved by the expansion chambers 40 into filtering positions. It will be noted that one filter plate of each expansible chamber in the assemblage between the end thrust plates 21, is designated by the numerals 60 while having the same drainage grooves and filter cloth arrangement as the other filter plates, it has one edge of the diaphragm 41 secured directly thereto as in the case of the end thrust plates 21. The filter plate 43 cooperating with the plate 60 to form an expansible chamber 40, has the plate 42 to which the other edge of the diaphragm 41 is attached, removably secured thereto to make possible the assembly of the diaphragms to these filter plates 42 and 60. The alternate filter plates 43, as best seen in Figs. 4, 5 and 6 near their upper edges, each have a slurry inlet elbow 61 extending laterally thereof to communicate with aligned ducts 62 through the plates 43, screens 54, and border plates 57 and rubber mats 55, 56, 58 and 59. These ducts lead to the ducts 35 in the filter frames 31 and 32 in order that the slurry may be run into the filtering chambers 33 from a main slurry supply pipe 63 having a valve 64 therein. This supply pipe 63 is connected to the inlet elbows 61 of the several filter plates 43 by short lengths of hose 65 which permit horizontal movement of the filter plates when moved toward and from the filter frames. The solids and cakes formed in the filter frame chambers 33 are designated by the numerals 66.

Filtered liquid after passing from the chambers 33 through the filter cloths or screens 54 and down through the drainage channels 45 and 46, passes as filtrates through outlet ducts 67 located at the bottom of the frames which are connected by flexible hoses 68 to the main discharge pipes 69 and 70. After the filtering step is completed, leaving cakes 66 behind in the filter frames 26, and all filtrate has been drained from the pipes 69 and 70, wash water or solution may be admitted through the pipe 69 to pass up through the drainage channels, through the filter cloth and cake and finally through the filter cloth on the opposite side of the filter chamber 33 to its connecting drainage channels and ducts 67 to discharge through the filtrate pipe 70. Reverse flow of wash water through the filter frames may be accomplished by entering pressure water back through the pipe 70 to pass through the filter cloths and cake from filter plate 60 to the plate 43 and then to discharge through the pipe 69.

When the desired filtration and washing of the filtering plates has been completed, the air or liquid pressure in the diaphragm chambers 40 is relieved whereby, from vacuum set up thereby or by any other suitable means, the filter plates 43 and 60 of the pressure chambers 38 are retracted from their sealing positions against the filter frames 26. At this time air under pressure may be forced through the filtrate outlet pipes 69 and 70 and the drainage channels 45 and 46 to blow solids from the filter cloths.

The assembly or series of filter frames 26 may be thereupon revolved to move the cake filled frames from between the pressure chambers 38 for removal of the cake and cleaning of the frames, and at the same time to move clean empty filter frames into the spaces just vacated by the filled frames, whereupon the apparatus is ready for pressure to be entered into the expansible chambers 40 from the pipe 51 to move the filter plates 43 and 60 against opposite sides of the filter frames which have been entered between the expansible chambers. This pressure causes the filter plates with their rubber mats 57 to be sealed against the rubber coatings 59 on opposite sides of the individual filter frames to seal the filtering chambers 33 against leakage and ready for the admission thereto of slurry from the pipe 63. Slurry is fed to these chambers 33 under pressure in excess of 14 pounds per square inch, to thereby effectively separate the liquids from the solids thereof as explained hereinbefore.

The modification of the plate and frame pressure filter illustrated in Figs. 13–20 inclusive, also accomplishes the purpose of the invention. Referring to the drawings, a rigid thrust absorbing framework 112 comprises a base 113 from which rise four corner post "I"-beams 114 and two center bracing "I" beams 115, supported and connected at the opposite ends of a rotary shaft 116 and a non-rotary shaft 117. The thrust frame supporting I beams 114 and center bracing I beams 115 are connected by plates 118. The supporting shafts 116 and 117 are secured to the frame by means of bearing lugs 119, thrust collars 120, and the thrust nuts 121. The spacing between end thrust frames is maintained by spacing lugs 122 fastened to the shafts 116 and 117 adjacent the bearing lugs 119. A series of spaced filter frames are secured to the rotatable shaft 116 by means of frame brackets 124. Interspaced with the frames are a series of expandable chambers 126 shown in expanded or filtering position in Fig. 16, and closed or cake removable position in Fig. 17. The frames include opposed complementary frames 123, secured to rotatable shaft 116 and adapted to rotate therewith. One end of the shaft is provided with a worm wheel 127 driven by a worm gear 128 connected to an electric motor 129. The motor 129 may be controlled manually or automatically to revolve the series of paired or double filter frames through an arc of 180 degrees each time the motor is energized and to come at a stop at the point where one set of frames registers with the pressure chambers. The purpose of this is to cause the double filter frames to have one grouping of frames disposed between the pressure chambers to form filtration chambers, while the opposite grouping of filter frames is simultaneously disposed 180 degrees beyond the filter chambers in a position for removal of solid cake and cleaning.

The expansible chambers which interspace the frames are adapted to expand and contract, and, since the units are spaced between the end thrust plates of the framework, expansion of the chambers will be confined, therefore, engaging the frames in tight sealing relation to form filtering chambers. The filtering operation may, therefore, be carried out by admitting the mixture to be filtered into the chambers under pressure, without leakage between the frames and plates. The expansible chambers are supported in their spaced relation between the thrust adsorbing framework ends by support lugs 130 resting on the rotatable shaft 116 and support lugs and journals 131 resting on the non-rotary shaft 117. The sides of the expansible chambers thus are free to move for a limited and controlled distance back and forth on the shafts 116 and 117 to alternately seal and open the filter chamber and interposed frames for the alternate filtration and cake removal steps of the desired filtration.

The frames are adapted to rotate in and out of register with the expansion chambers, and in the preferred arrangement the full filter frame leaves the assembly by rotating downward. The rotation of the frames out of register with the expansion chambers is permitted when the sides of the pressure chamber with their filter means and sealing surfaces are moved inwardly on the supporting lugs 130 and journal 131 as by releasing pressure and applying vacuum to the expansion chambers.

A header 132 is connected to a suitable source of actuating pressurized fluid through pipe line 135, and to a vacuum source through pipe line 135a. A two-way valve 134 is provided on the header line to allow either pressurizing fluid or vacuum to enter pressure chambers 126 through lateral lines 133 and ports 164. A slurry feed header 136 is connected to a source of material to be filtered. A two-way valve 144 is provided in this header to allow slurry, under pressure, to enter filter chamber 33 through lateral lines 136a and inlet ports 165 and 165a. Header 143 connected to valve 144 is connected to a suitable source of washing liquid and blowing air under pressure to allow their introduction into filter chamber 33 after the filtration cycle.

Filtrate from the filtering operation is withdrawn from the filter through lateral filtrate lines 137 which are connected to a header 138 and by lateral filtrate lines 139, which are connected to a header 140. The headers 138 and 140 are equipped with two-way valves 141 and 142. These two-way valves are connected to headers 143a and 143b respectively, which are provided with connections to a source of compressed air or washing fluid, which can thus be introduced at the will of the operator.

In this form of the invention the mixture to be filtered is fed under pressure into the bottom of the circular frame substantially in the middle thereof and rises upward into the filtering chamber, thus preventing the separation of coarse particles and fine particles in case it is desired to filter slurries which tend to segregate in the filter chamber during the filtering operation. A further advantage is also obtained in this modification of the invention in that means are provided for the introduction of wash water and compressed air into the bottom of the filter chamber through the line 143. This enables the operator at his desire, and to fit the variations in the type of slurry to be filtered, to regulate the quantity of the mixture to be filtered so that the filter chamber is not entirely filled but contains an open partition in the middle dividing the solids into two approximately equal cakes formed on each filter surface. The washing solution then entering into the filter chamber, following the filtering operation, fills the partition between the cakes and effectively cleans the solids by passing through the separated cakes in the same manner as the original solution contained in the slurry. It is also obvious that the operator can alternately use the usual method of introducing wash solution through header 138 to pass through the solid cake and escape through lateral lines 139 and header 140.

Figure 16:
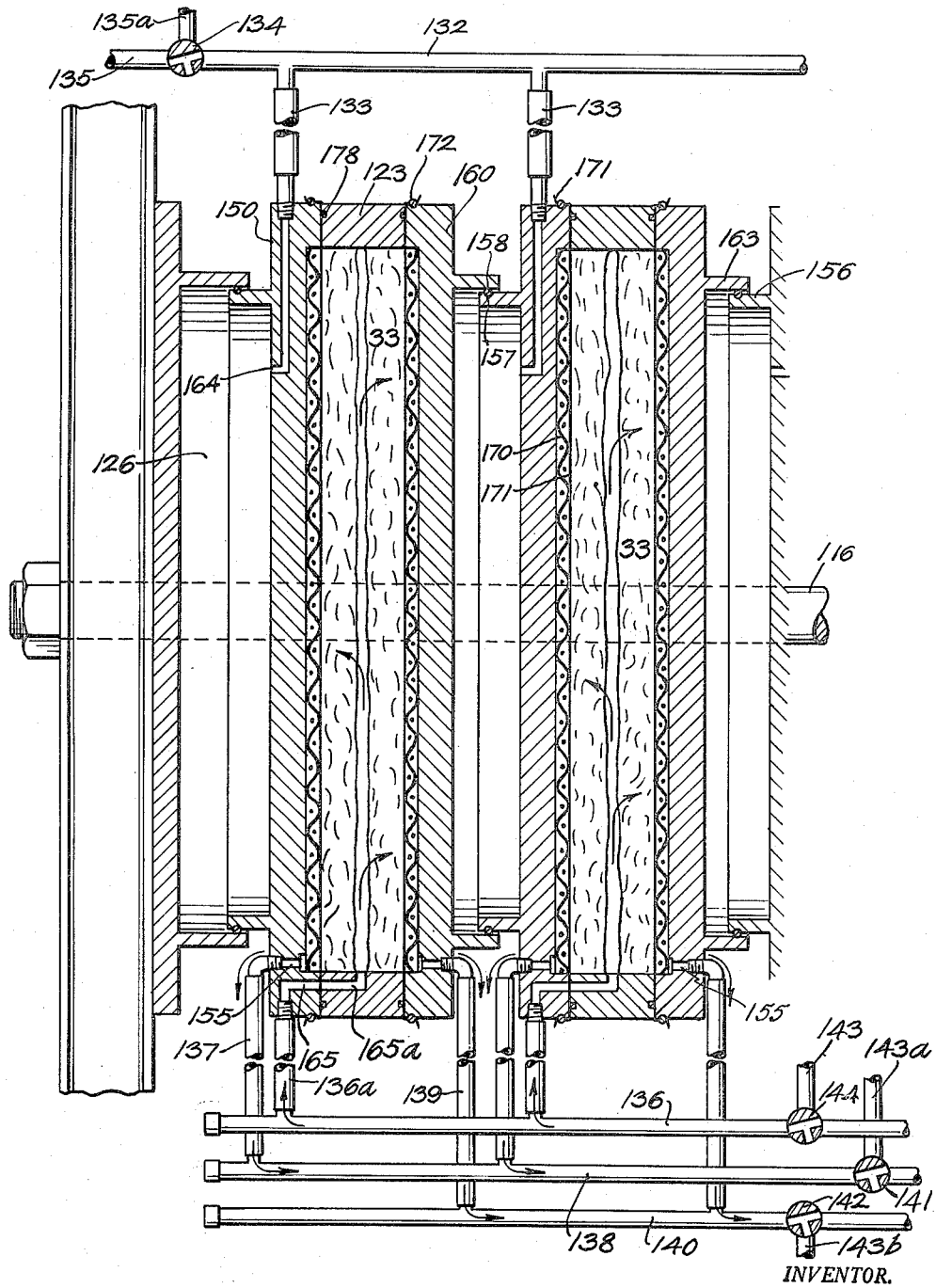
Fig. 16 is a cross section of the modified expansion chamber and filter plate assembly in position during a filling and filtering cycle with the pressure chambers expanded and forced against the filter frames and the thrust of the pressure chambers contained by the end thrust plates of the assembly.

Figure 16 is a section through the pressure filter illustrating the invention during the filling or filtering cycle, and Figure 17 a similar section during the opening or cake removal cycle. Each expansible chamber 126 comprises a male plate 150 and a female plate 160 further illustrated in Figures 18–21 inclusive. The male section 150 is a substantially circular plate with two supporting lugs number 130 and 131, located on opposite edges to bear upon rotating shaft 116 and fixed shaft 117. The filter face of the plate is provided with a shallow recess to receive a wire mesh drainage screen 170, over which a filter media 171 is placed. The filter media 171 is held in position on the face of the filter plate by a retaining ring 172, which is slipped over the filter cloth and compresses the cloth into a groove 152, which encircles the edge of the plate. The drainage screen is retained on the surface of the recessed plate by short screws 171a into the plate surface as shown in Fig. 19.

On the opposite side of the filter face of the male plate is a deep recess formed by a circular wall 156. This circular wall forms a part of the pressure chamber by telescoping into a corresponding but larger diameter recess of the female plate. A groove 157 in the outer surface of circular wall 156 provides a sealing means with a round rubber gasket seal 158 called an O ring when the male plate is telescoped within the corresponding female plate. An inlet 164 is provided in the plate to provide connection with fluid under pressure or vacuum from header 132 and laterals 133. A slurry feed inlet 165 provided through the plate substantially at the bottom for admitting the mixture to be filtered under pressure through lateral headers 136a, connected to header 136. A filtrate passage 155, through the plate, connects the bottom portion of the recessed filter face with lateral 137 of filtrate header 138.

The female plate 160 also comprises a circular plate with supporting side lugs 130 and 131, and a similar but opposite positioned recessed face to receive the wire mesh drainage screen 170, which is, similarly, attached to the recessed face by short screws at suitable intervals. The filter media is placed over the screen surface and filter face plate edges and retained by retaining ring 172 in groove 152. The female plate is also provided with filtrate outlet 155 in the lower position of the plate passing through the plate and connecting the space behind the drainage screen with filtrate drainage lateral 139 to header 140. On the opposite face of the female plate from the filter surface is a deep recess formed by an internal flange 163, similar to, but larger in diameter than, the external flange 156 of the male plate. In this manner the male plate wall 156 telescopes into the female wall 163 and forms a fluid-tight chamber with the sealing means of round rubber gasket or O ring 158. The arrangement provides free reciprocal movement between the filter faces of the pressure chamber. However, other types of seals may be obviously used to seal the two plates together to form a fluid-tight chamber therebetween and other variations in fastening the filter media and providing drainage thereunder to filter outlets. Furthermore, a perforated plate may be used in place of the wire screen or in addition to the wire screen, or a grooved surface in the face of the plate. The wire screen 170 is a preferred method and its mesh or size can be varied to suit the particular operation.

The filter frames 123, which form the filter chambers when rotated into place, are provided with gaskets 178 which abut the border or margin of the filter plate and filter media surface outside the perimeter of shallow recess holding the drainage screen 170. A fluid-tight chamber is thus formed when the expansible chambers are fully expanded against the gaskets 178 and the peripheral edges of the frame. An inlet passage 165a is provided in the bottom portion of filter frame 123 in a position to register and communicate with slurry inlet 165 when the frames are positioned and sealed. A small thimble or ferrule 175 Fig. 19 is pressed into the feed inlet 165 to hold the filter media, and prevent the slurry from passing into the space behind the filter media.

Referring again to Figure 16, the operation of the invention with this modfiication is described in the case of a slurry or mixture containing heavy solids and valuable solution. The filter frames 123 have been rotated and stopped in position between pressure chambers 126. Pressure chambers 126 have been fully expanded to form a fluid-tight pressure chamber with gasket 178 in the edge surface of the ring abutting against the filter media and the corresponding circular surfaces of male plate 150 and female plate 160. The slurry or mixture to be filtered has been introduced through header 136, laterals 136a, inlet 165 and 165a under pressure of approximately 50 pounds per square inch. This pressure can be varied at the will of the operator, but the selected pressure is typical. The slurry rising into the filter chamber has maintained a uniform mixture while forming two separated cakes on each filter media. The valuable solution has passed through the filter media and has escaped through filtrate passage 155 into header 138 and 140, and such tanks or storage as are properly provided. The admission of slurry has been stopped at a time when a space still exists between the two cakes forming a so-called "split cake," and excess slurry filling the central space has been allowed to drain back into the slurry supply tank. At this point washing solution has been introduced into the slurry inlet header 136, where it has displaced and removed the valuable liquor remaining in the cake by carrying it into the filtrate outlet. Finally, compressed air has been introduced into the slurry inlet removing excess wash solution and preparing the cake for removal. At this point the moisture removal air has been cut off from slurry inlet header 136 and blowing air introduced into filtrate header 140 and 138 by valves 141 and 142 and blowing air headers 143a and 143b. This air passing through the filter media from the reverse side has freed the cloth of its cake and escaped through header 136.

Figure 17 illustrates the same pressure filter following the filtering, washing, moisture removal and back blowing operations described. The pressure chambers 33 have been emptied of pressurizing air and withdrawn from their sealing position by vacuum or other suitable means. The filter frames contain the separated solids. The filled frame is thus revolved downward and outward away from the opened space between the retracted chambers at the same time that the opposite paired and emptied frames enter the space from above to repeat the cycle.

One important aspect of the invention is the use of expansible chambers between the frames for sealing the filter in operational position. Since the chambers expand and contract, the filter frames are not required to move laterally any substantial distance, and, therefore, the opening and the closing of the press is quickly and easily accomplished.

Another important improvement of the invention is the bottom fill port for the filter frame. The bottom filling permits filtering sandy slurries by keeping the slurry in the filter chamber agitated, and, especially, agitating the bottom where the sands tend to accumulate. Further, slurry in the chamber may be drained out without opening the filter. This permits washing and/or drying the cake without diluting the slurry. Thus, the bottom port provides a gravity discharge of slurry or liquid from the filter chamber, and permits the use of an uninterrupted space for the formation of a cake or a split cake.

While the invention has been illustrated by reference to specific illustrations, there is no intent to limit the invention to the precise details so described, except insofar as limited in the following claims.

I claim:

1. In a filtering apparatus a series of vertical expanding and retracting sided pressure chambers alternately spaced between filtering chambers with the rigid sides of the pressure chambers forming on their exterior faces the filter plate sides of the filter chambers on which are attached drainage grooves and filter cloth in such a manner that a pressure-tight filter chamber is formed when the sides of the pressure chamber are moved outward against the margins of a movable filter press frame; means for sealing the surface of the margin of the frames and corresponding surface of the filter plates against escape of liquid under pressure; means for supporting the filter press frames in such a position that they are movable only in a vertical plane at right angles to the horizontal axis of said pressure chambers; means for expanding and retracting the filter plate sides of said pressure chambers in a direction alternately outward and inward along the horizontal axis of the chambers while maintaining the spacing of the center lines of said pressure chambers along the horizontal axis; means for supplying a mixture of liquids and solids under pressure to the inside of the filter chambers when the pressure chamber sides are expanded to form a tight seal with their corresponding filter frame; means for conducting filtrate away from the filtering chambers after its passage through the filter cloth; means for moving the filter frames in a vertical plane at right angles to the horizontal axis of the chambers to a position where the solids contained on the filter frames can be removed outside the device when the sides of said pressure chambers are withdrawn from their sealing position against the margins of said filter frames; means for rigidly mounting the assemblage of pressure chambers and filter chambers in a framework in operative position to confine the thrust of the pressure chambers in a horizontal line and at the same time maintain the relative position and spacing of the alternate filter and pressure chambers.

2. In a filtering apparatus a series of filter chambers, each of which comprises a movable filter frame and a pair of movable filter plates provided on their faces with grooving covered by a filter medium; said filter frame and pair of filter plates forming a liquid-tight filter chamber when the filter plates are pressed against the margins of the filter frame; gasket means for sealing the surface of the margins of the frames and corresponding surface of the filter plates against liquids under pressure, a pressure chamber inter-spaced between each of the filter chambers with rigid sides forming the sides of the filter plates; means for confining operative pressure in the pressure chambers to provide inward and outward movement of the rigid sides of the filter chambers under influence of operative pressure; means for operating said pressure chambers; means for supplying a mixture of liquids and solids under pressure into said filter chambers; means for conducting filtrate away from said filter chambers after its passage through the filter medium; means for moving the filter frames in a plane at right angles to the interspaced filter chambers when the filter plate sides of the filter chamber are moved away from their sealing position; means for spacing and supporting the filter frames to occupy the spaces between said pressure chambers; means for mounting said pressure chambers to maintain a uniform and equal spacing of the pressure chambers and filter frames; and means for confining the thrust of the pressure chambers in a direction along the axis of the assembly at right angles to the frames.

3. In a filtering apparatus a series of filter frames including pairs of complementary frames joined together at their ends in a common plane at right angles to a shaft, to which they are affixed at regular spaced intervals; means for rotating the shaft and the spaced pairs of filter frames; means for mounting the assemblage of pairs of filter frames and rotative shaft to permit the filter frames to occupy in rotative sequence a space between laterally movable filter plates; means for moving said filter plates to engage the margins of the filter frames to form equally spaced filter chambers; means for moving the filter plates away from said frames to permit the rotative removal of said frames and the rotative insertion of the complementary frames in the vacated spaces; a series of pressure chambers mounted between the plates whereby to force the filter plate surfaces against the positioned filter frames; means for introducing and removing pressurizing fluids into the pressure chambers; means for introducing a mixture of liquids and solids to the formed filter chambers; means for removing filtrate from the filter chambers; means for attaching filter medium over liquid-carrying spaces on the filtering face of the filtering plates; and means for supporting said assembly.

4. In a filtering apparatus a series of vertical expanding and retracting sided pressure chambers alternately spaced between filtering frames with rigid sides of the pressure chambers forming on their exterior faces the filter plates of a filter chamber; means inclusive of drainage groves and filter medium on said plates to form a pressure-tight filter chamber when the sides of the pressure chamber are moved against the margins of a movable filter press frame; means for sealing the surfaces of the margins of the frames and corresponding surfaces of the filter plates against escape of liquid under pressure; means for supporting the filter frames in such a position that they are movable in a vertical plane at right angles to the horizontal axis of said pressure chambers midway between the centers of the said chambers; means for expanding and retracting the filter plate sides of the pressure chambers; means for supplying a mixture of liquids and solids under pressure into said filter chambers when the pressure chamber sides are expanded to form a tight seal with the filter frames; means for conducting filtrate away from said chambers; means for joining pairs of the filter frames end to end in a common plane at right angles to a common shaft to provide pairs of complementary frames at regularly spaced intervals to register with the spaces between said pressure chambers; means for rotating the joined pairs of filter frames to permit the frames to occupy in rotative sequence the space between said pressure chambers to form, when stopped and sealed against the filter plates, a filter chamber; means for rotating the shaft and assembly of complementary filter frames with enclosed filtered solids to a position outside the filter plates for removal of cake while the opposed members of the paired plates are rotated into the vacated space of the filled filter frame; means for mounting the assemblage of pressure chambers and filter chambers in a framework to confine the thrust of the pressure chambers and to maintain the relative spacing of the pressure chambers and filter chambers; and means for mounting the rotative shaft and attached complementary filter frames on the same assembly axially aligned with said pressure chambers whereby to rotate the frames within the spacing of the filter plates.

5. A plate and frame type filter apparatus comprising opposed complementary filter frames laterally rotatable about a common axis, fluid pressure actuated expansion chamber means juxtaposed to engage said filter frames on one side of said axis including filter medium means contacting said frames to form filter chambers therewith, means supplying fluid pressure to said expansion chamber means for urging the assembly into sealed filtering relation, said frames rotatable about said axis for moving one side into filtering relation with said expansion chamber means and the other side into open cleaning relation, and means for feeding each said filter chambers and withdrawing filtrate.

6. A filtering apparatus comprising support means, a plurality of parallel frames carried by said support means, opposed plates on each side of said frames forming therewith a filter chamber assembly, openings in said frames and plates providing inlet and outlet ports to said filter chamber assembly, fluid pressure actuated expandible chamber means positioned between each of said filter chamber assemblies to urge the plates thereof into sealing engagement with the frames, conduit means connecting said expandible chambers with a source of activating fluid pressure and means carried at the ends of said support means to confine the thrust of the expandible chambers, and means for moving said frames out of alignment with said plates for cleaning said frames including a pair of rows of coplanar complementary frames alternately disposable between said plates whereby one of said pair of complementary frames is disposed out of alignment with said plates for cleaning while its complementary frame is positioned between said plates, and means for successively rotating said frames between said plates.

7. In a filtering apparatus a plurality of paired laterally movable filter plates, a filter frame positioned between the plates of each pair of filter plates and forming therewith a filter chamber when the filter plates are pressed against said frame, means for pressing said plates against said frame, said means including an expansible and contractible chamber between adjacent pairs of filter plates, means connecting said expansible and contractible chambers to a source of pressure fluid, means mounting said frame for movement out of alignment with the filter plates for removal of filter solid therefrom, means for supplying a slurry to be filtered to the filter chamber, means for moving each frame into and out of alignment between its complementary filter plates and means for conducting filtrate from said filter chamber.

8. In a filtering apparatus, a series of vertically movable filter frames and a series of expanding and contracting pressure chambers adapted to be arranged with a filter frame disposed between each pair of pressure chambers, means connecting said pressure chambers with a source of activating fluid under pressure for expanding and contracting said chambers, said pressure chambers having horizontally movable sides provided with filtering media and adapted to be moved into contact with the frame to form therewith enclosed filter chambers, means for confining horizontal thrust of said pressure chambers to form liquid-tight filter chambers, means for supplying a mixture of solids and liquids under pressure to said filter chambers, means for conducting filtrate away from said filter chambers, each filter frame comprising a pair of identical coplanar complementary frames alternately disposable between said pressure chambers whereby one of said pair of complementary frames is disposed out of engagement with said pressure chambers for cleaning while its complementary frame is positioned between said pressure chambers.

9. In a filtering apparatus a series of filter chambers, each of which consists of two laterally movable filter plates, a vertically movable filter frame which forms with each two filter plates a liquid-tight filter chamber when said plates are pressed against said frame, an expansible and contractable chamber interposed between adjacent filter plates to move said filter plates horizontally into and out of contact with said filter frame, means connected with said chambers for supplying activating fluid under pressure for expanding and contracting said chambers for respectively moving the plates into and out of filtering engagement with said frames, said filter frame being movable in a vertical plane to enable the removal of filtered solids beyond the position of the filter chambers, means for supplying a mixture of liquids and solids under pressure to said filter chamber, and means for conducting filtrate away from said filter chamber, said filter frame comprising a pair of complementary frames joined together in a common plane and rotatably mounted on an axis passing through the juncture of said complementary frames whereby the frames are alternately disposable between said filter plates.

10. In a filtering apparatus a series of filter chambers, each of which consists of two laterally movable filter plates, a vertically movable filter frame which forms with each two filter plates a liquid-tight filter chamber when said plates are pressed against said frame, an expansible and contractable chamber interposed between adjacent filter plates to move said filter plates horizontally into and out of contact with said filter frame, means connected with said chambers for supplying activating fluid under pressure for expanding and contracting said chambers for respectively moving the plates into and out of filtering engagement with said frames, said filter frame being movable in a vertical plane to enable the removal of filtered solids beyond the position of the filter chambers, means for supplying a mixture of liquids and solids under pressure to said filter chamber, and means for conducting filtrate away from said filter chamber, said filter frame is rotatably mounted upon an axis extending at right angles to the vertical planes of said filter plates and expansion chambers whereby said filter frame may be moved in between said filter plates into filtering position or out from between said plates for cleaning.

11. In a filtering apparatus as defined in claim 10 wherein means are provided for sealing the joints between said filter plates and filter frame when said frame is disposed between said expansion chambers to form the filtering chamber.

12. The filtering apparatus as defined in claim 11 wherein said means for conducting filtrates includes means for conducting wash liquid back through said filtrate conducting means when said filter frame is in filtering position and for conducting air under pressure back through said filtrate conducting means when said filter frame is disposed out beyond said filter plate.

13. A plate and frame type filter apparatus comprising a support, plural filter frames for spaced assembly thereon, an immovable thrust plate carried by said support at each end of said assembly, plural expansion means sandwiched with said frames for sealing said frames in filtering relation between said thrust plates, means for expanding and contracting said expansion means into and out of filtering relation with said frames, said frames including a pair of rows of coplanar complementary frames alternately disposable between said expansion means whereby one row of frames is disposed out of filtering alignment for cleaning while its complementary frame is positioned between said plates, and means for successively rotating said rows of frames between said expansion means.

References Cited in the file of this patent

UNITED STATES PATENTS

| | | |
|---|---|---|
| 564,422 | Dehne | July 21, 1896 |
| 900,184 | Merrill | Oct. 6, 1908 |
| 1,415,611 | Perotti | May 9, 1922 |
| 2,226,920 | Carver | Dec. 31, 1940 |
| 2,431,943 | Land et al. | Dec. 2, 1947 |

FOREIGN PATENTS

| | | |
|---|---|---|
| 123,589 | Great Britain | Feb. 27, 1919 |
| 393,174 | Great Britain | June 1, 1933 |